(12) United States Patent
Sato et al.

(10) Patent No.: US 6,434,710 B1
(45) Date of Patent: Aug. 13, 2002

(54) COMMIT CONTROLLING SCHEME FOR TRANSACTION PROCESSING IN SYSTEM UTILIZING CHECK POINT/ROLL BACK SCHEME

(75) Inventors: Kiyoko Sato; Toshio Shirakihara; Tatsunori Kanai; Hideaki Hirayama, all of Kanagawa (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/337,522

(22) Filed: Jun. 22, 1999

(30) Foreign Application Priority Data

Jun. 22, 1998 (JP) .......................................... 10-174813

(51) Int. Cl.$^7$ ............................................. G06F 11/07
(52) U.S. Cl. ............................ 714/2; 709/101; 712/228
(58) Field of Search ............................... 714/2, 13, 15, 714/16, 57; 709/101, 203; 712/228; 707/202, 204

(56) References Cited

U.S. PATENT DOCUMENTS

| | | | |
|---|---|---|---|
| 5,247,664 A | * | 9/1993 | Thompson et al. |
| 5,333,314 A | * | 7/1994 | Masai et al. |
| 5,745,730 A | | 4/1998 | Nozue et al. |
| 5,907,673 A | | 5/1999 | Hirayama et al. |
| 6,055,547 A | * | 4/2000 | Cooper et al. |

OTHER PUBLICATIONS

Jim Gray, et al., "9.4.7; Group Commit, Batching, Boxcarring," Transaction Processing Concepts and Techniques, (1993), pp. 509–510.

Yoshio Masubuchi, et al., "Fault Recovery Mechanism for Multiprocessor Servers," Digest of Papers of The 27$^{th}$ Annual International Symposium on Fault–Tolerant Computing, (1997), pp. 184–193.

* cited by examiner

Primary Examiner—Gopal C. Ray
(74) Attorney, Agent, or Firm—Oblon, Spivak, McClelland, Maier & Neustadt, P.C.

(57) ABSTRACT

A commit controlling scheme for a transaction processing in a system utilizing the check point/roll back scheme, which is capable of guaranteeing the reliability of data of the transaction processing even when the transaction processing and the check point/roll back scheme are employed simultaneously, is described. An issuance of an external output for notifying to a user that a transaction has been committed is delayed until after a new check point for the transaction processing process is generated by the fault recovery mechanism at a timing later than a commit of the transaction by the transaction processing process. This can be realized by delaying an issuance of a transaction commit notice from the transaction processing process, or by intercepting a transaction commit notice sent from the transaction processing process, or else by delaying an issuance of the external output by the client process after receiving a transaction commit notice from the transaction processing process.

12 Claims, 14 Drawing Sheets

COMMIT MANAGEMENT TABLE

COMMIT CONTROLLING SCHEME FOR TRANSACTION PROCESSING IN SYSTEM UTILIZING CHECK POINT/ROLL BACK SCHEME

BACKGROUND OF THE INVENTION

1. Field of the Invention

The present invention relates to a commit controlling scheme for a transaction processing in a system utilizing the check point/roll back scheme such as a high availability system.

2. Description of the Background Art

Conventionally, the check point/roll back scheme is known as a method for re-executing a process that was interrupted due to an occurrence of a fault in a computer. In the check point/roll back scheme, information necessary in re-executing a process is periodically or recurrently stored. A timing for storing this information is called a check point, and an act of storing this information at a check point is called a check point generation. When a fault occurs in a certain process or a computer on which this certain processing is operating, a state of the process is rolled back to a check point before the fault occurrence according to the information stored at the most recent check point, and the process is re-executed from that check point before the fault occurrence.

Also, in general, a processing to be executed by a computer follows a sequence of updating data on a main memory or a secondary memory device according to entered data, and then outputting some kind of result. As a technique for improving the reliability of these data, the transaction processing is known.

The transaction processing has the following four properties which are referred to as ACID.

(1) Atomicity: a property that a transaction which defines a unit of processing is either completely executed (committed) or not executed at all (aborted).

(2) Consistency: a property that an execution of a transaction changes data from one consistent state to another consistent state.

(3) Isolatedness: a property that an intermediate result obtained during an execution of a transaction is not available to any other transaction until the executed transaction is committed.

(4) Durability: a property that data updated by the committed transaction are permanent ones which will not be lost by a fault or the like that occurs afterwards.

By these properties, the transaction processing guarantees the reliability of data.

However, if the check point/roll back scheme is adopted in the conventional transaction processing, it is impossible to guarantee the reliability of data processed by the transaction processing. The reason for this will now be described with reference to FIG. 1.

In FIG. 1, CP(n) denotes the n-th check point (CP), and CP(n+1) denotes the n+1-th check point (CP). In the transaction processing of FIG. 1, a user makes an external input ("input" in FIG. 1) such as a keyboard input once, and in response to this input, a client process sends a request for "select", "update", and "commit" to the transaction processing process. The transaction processing process selects data ("select" in FIG. 1), updates data ("update" in FIG. 1) and commits the transaction by confirming the updated content of data ("commit" of FIG. 1). When the transaction is committed, the transaction processing process notifies to the client process that the transaction has been committed. Upon receiving this notice, the client process carries out an external output ("output" in FIG. 1) such as a screen display, and notifies to the user that the transaction processing has been committed.

During this transaction processing, check points are periodically or recurrently generated on a server computer on which the transaction processing process. For example, suppose that after the check point CP(n), the transaction processing process executed "select", "update", and "commit", and sent the transaction processing commit notice to the client process, and the client process carried out the external output for notifying to the user that the transaction processing has been committed, and then a fault occurred. The next check point CP(n+1) has not been generated yet, so that the transaction processing process rolls back to the most recent check point CP(n), that is, to a state before the execution of "select", "update", and "commit". As a result, the processing done by the transaction is actually all cancelled and invalidated despite the fact that the user has already been notified that the transaction processing has been committed.

Thus when the transaction processing and the check point/roll back scheme are employed simultaneously, there has been a possibility for the committed transaction to be invalidated despite the fact that the user has already been notified that the transaction processing has been committed by way of the external output.

SUMMARY OF THE INVENTION

It is therefore an object of the present invention to provide a commit controlling scheme for a transaction processing in a system utilizing the check point/roll back scheme, which is capable of guaranteeing the reliability of data of the transaction processing even when the transaction processing and the check point/roll back scheme are employed simultaneously.

According to one aspect of the present invention there is provided a commit control method for transaction processing executed in a computer system having a fault recovery mechanism for generating check points by recurrently recording process states and for restarting processes by recovering the process states at a check point before a fault occurrence in a case of the fault occurrence, the method comprising the steps of: detecting a generation of a new check point for a transaction processing process that executes the transaction processing, the generation being performed by the fault recovery mechanism after a transaction is committed by the transaction processing process; and controlling an issuance of an external output for notifying to a user that the transaction has been committed, such that the external output is issued after the generation of the new check point is detected by the detecting step.

According to another aspect of the present invention there is provided a computer system for executing transaction processing, comprising: a fault recovery mechanism for generating check points by recurrently recording process states and for restarting processes by recovering the process states at a check point before a fault occurrence in a case of the fault occurrence; and a commit control unit for detecting a generation of a new check point for a transaction processing process that executes the transaction processing, the generation being performed by the fault recovery mechanism after a transaction is committed by the transaction processing process, and for controlling an issuance of an external output for notifying to a user that the transaction has been committed, such that the external output is issued after the generation of the new check point is detected.

According to another aspect of the present invention there is provided a computer usable medium having computer readable program code means embodied therein for causing a computer to function as a system for executing transaction processing, the computer readable program code means includes: first computer readable program code means for causing said computer to realize a fault recovery mechanism for generating check points by recurrently recording process states and for restarting processes by recovering the process states at a check point before a fault occurrence in a case of the fault occurrence; and second computer readable program code means for causing said computer to realize a commit control unit for detecting a generation of a new check point for a transaction processing process that executes the transaction processing, the generation being performed by the first computer readable program code means after a transaction is committed by the transaction processing process, and for controlling an issuance of an external output for notifying to a user that the transaction has been committed, such that the external output is issued after the generation of the new check point is detected.

Other features and advantages of the present invention will become apparent from the following description taken in conjunction with the accompanying drawings.

DETAILED DESCRIPTION OF THE PREFERRED EMBODIMENTS

Referring now to FIG. 2 to FIG. 8, the first embodiment of the commit controlling scheme for a transaction processing according to the present invention will be described in detail.

Figure 2:
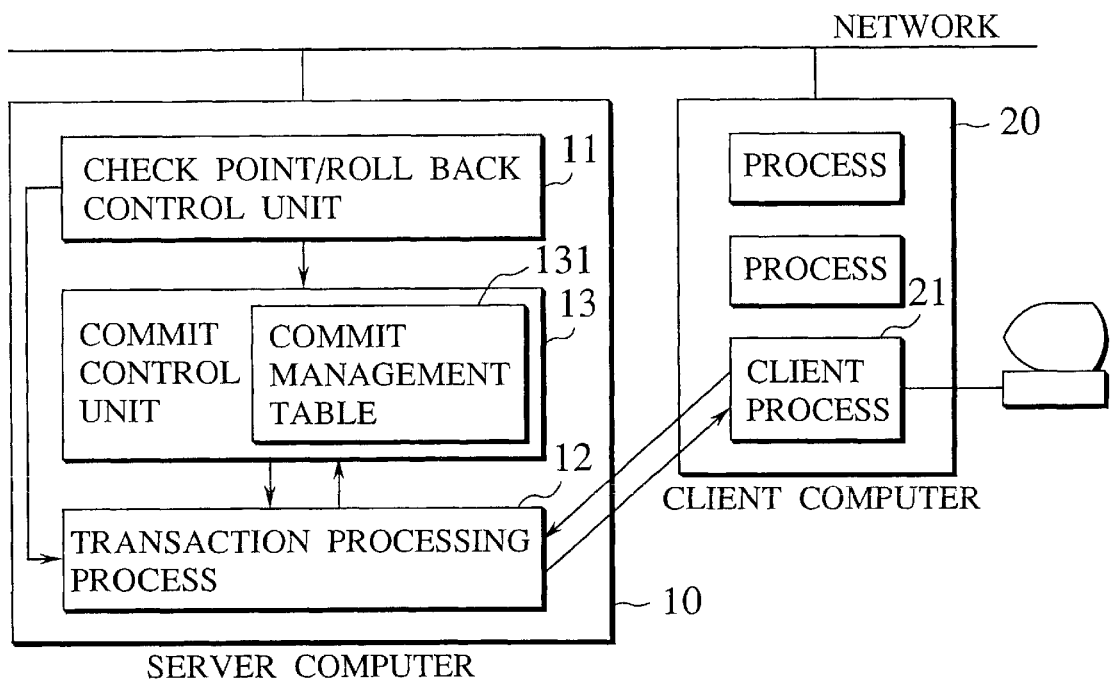
FIG. 2 is a block diagram of a computer system for realizing the commit controlling scheme according to the first embodiment of the present invention.

FIG. 2 shows a configuration of a computer system according to this first embodiment. This computer system is for realizing a transaction processing system which executes the transaction processing according to a request from a user process such as application. Here, as an example, a case of constructing the transaction processing system based on the client-server model will be described.

Figure 1:
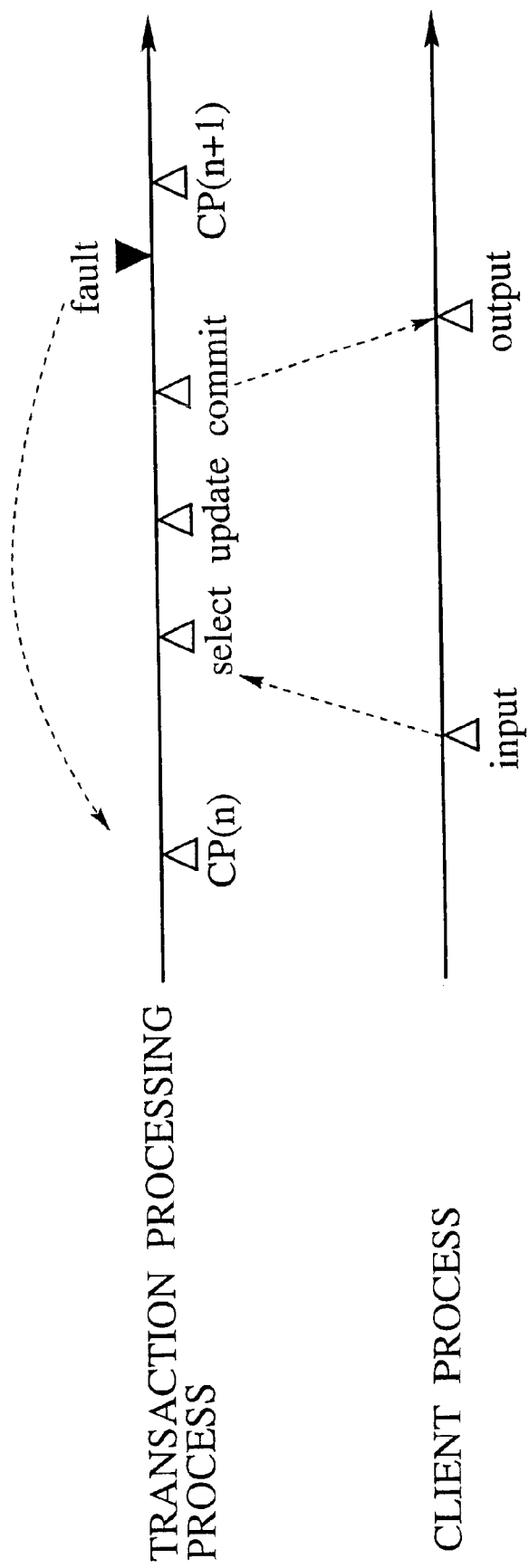
FIG. 1 is a sequence chart for a conventional transaction processing in the case of using the check point/roll back scheme simultaneously.

As shown in FIG. 1, the transaction processing system comprises a transaction processing process 12 to be executed on a server computer 10 and a client process 21 to be executed on a client computer 20.

The client process 21 is a kind of application (user process) for requesting the transaction processing to the transaction processing process 12, which sends a request for a series of transaction processing, that is, "select", "update", and "commit", to the transaction processing process 12 according to an external input such as a keyboard input from a user. Also, when it is notified from the transaction processing process 12 that the transaction has been committed, the client process 21 notifies to the user that the transaction processing has been committed, using an external output such as a screen display.

The transaction processing process 12 is for executing the transaction according to a request from the client process 21, which selects data at "select", updates data at "update", and commits the transaction by confirming the updated content of data at "commit". The transaction processing process 12 is realized using multi-threads, so that a plurality of transactions can be executed in parallel while maintaining their serial characteristics.

The server computer 10 on which this transaction processing process 12 is executed is further provided with a check point/roll back control unit 11 and a commit control unit 13.

The check point/roll back control unit 11 generates a check point by periodically or recurrently recording states of various processes executed on the server computer 10 including the transaction processing process 12, and notifies to the commit control unit 13 that the check point has been generated. Also, when a fault occurs, the check point/roll back control unit 11 rolls the processes back to the most recent check point, and notifies to the commit control unit 13 that the processes have been rolled back.

The commit control unit 13 is provided for the purpose of carrying out a controlling to delay an issue timing of the external output for notifying the commit of the transaction until after the check point generation. Namely, when the transaction processing is committed by the transaction processing process 12, the commit control unit 13 delays the transaction commit notice to be made by the transaction processing process 12 with respect to the client process 21 until a check point generation notice from the check point/roll back control unit 11 is newly received after that.

Figure 3:
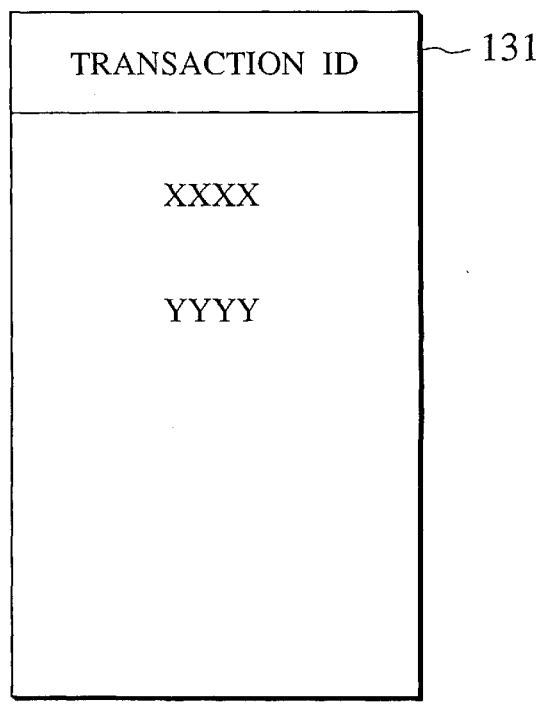
FIG. 3 is a diagram showing a commit management table used in the computer system of FIG. 2.

For the sake of this delay control, the commit control unit 13 uses a commit management table 131. This commit management table 131 contains information as shown in FIG. 3, for example. An ID entry registers a transaction ID for identifying a committed transaction, when the transaction G is committed. Then, at a time of a next check point generation, the issuance of the transaction commit notice for the registered transaction is commanded to the transaction processing process 12 while the transaction ID is deleted from the commit management table 131.

Namely, the transaction IDs registered in the commit management table 131 indicate the transactions which have been committed by the transaction processing process 12 and for which the delay is currently imposed.

The commit control unit 13 and the check point/roll back control unit 11 as described above can be realized in forms of codes within the transaction processing process 12, libraries linked to the transaction processing process, processes totally independent from the transaction processing process 12, or parts of the operating system (OS), for example.

Figure 4:
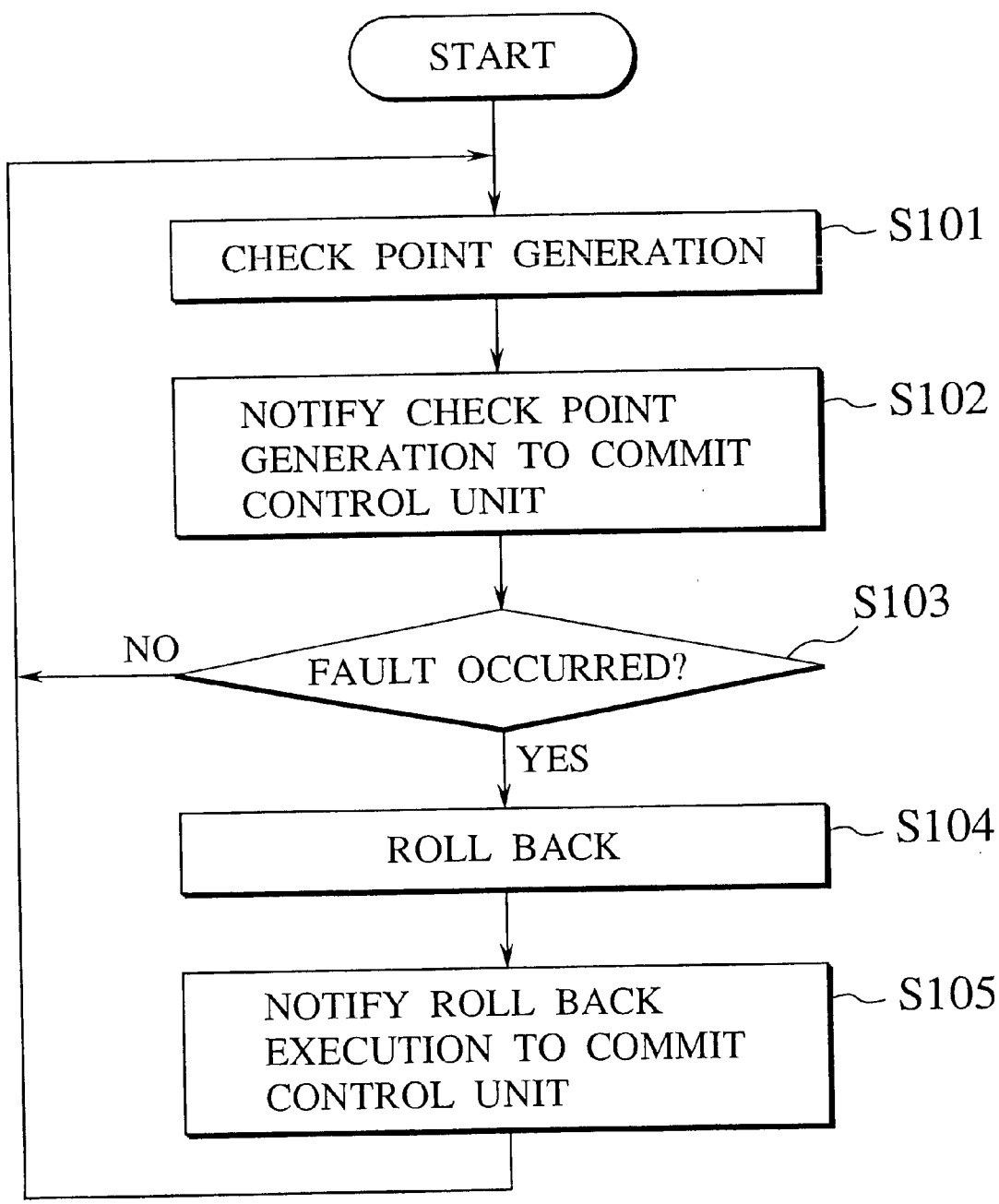
FIG. 4 is a flow chart for the operation of a check point/roll back control unit in the computer system of FIG. 2.

FIG. 4 shows a processing procedure of the check point/roll back control unit 11, which proceeds as follows.

Namely, the check point/roll back control unit 11 periodically or recurrently generates check points for various processes including the transaction processing process 12 (step S101). Then, whenever a check point is generated, the check point generation is notified to the commit control unit 13 (step S102). Also, when a fault occurs in the server computer 10 or a process executed on the server computer 10 (step S103 YES), the processes are rolled back to the most recent check point (step S104). Then, the roll back execution is notified to the commit control unit 13 (step S105).

Figure 5:
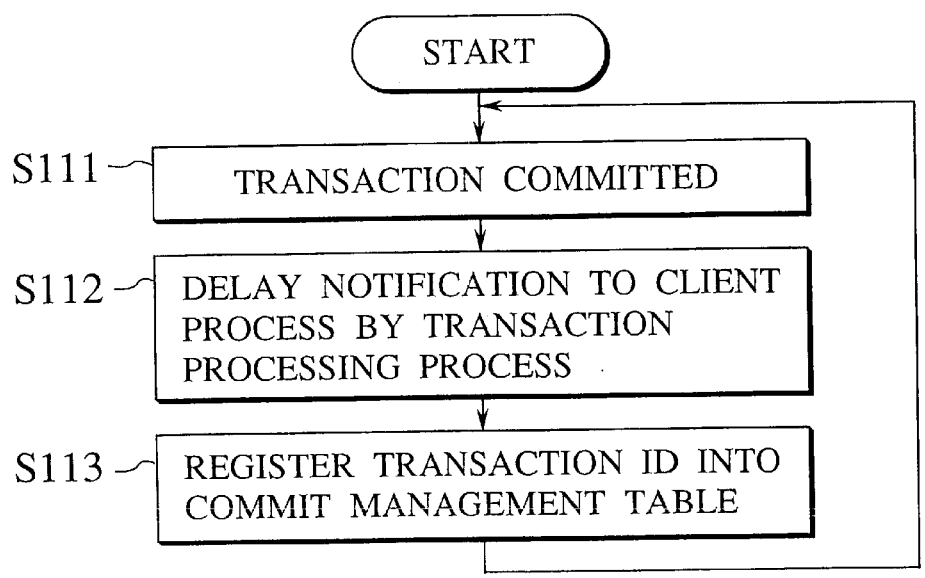
FIG. 5 is a flow chart for the operation of a commit control unit in the computer system of FIG. 2, in the case where a transaction is committed.
Figure 6:
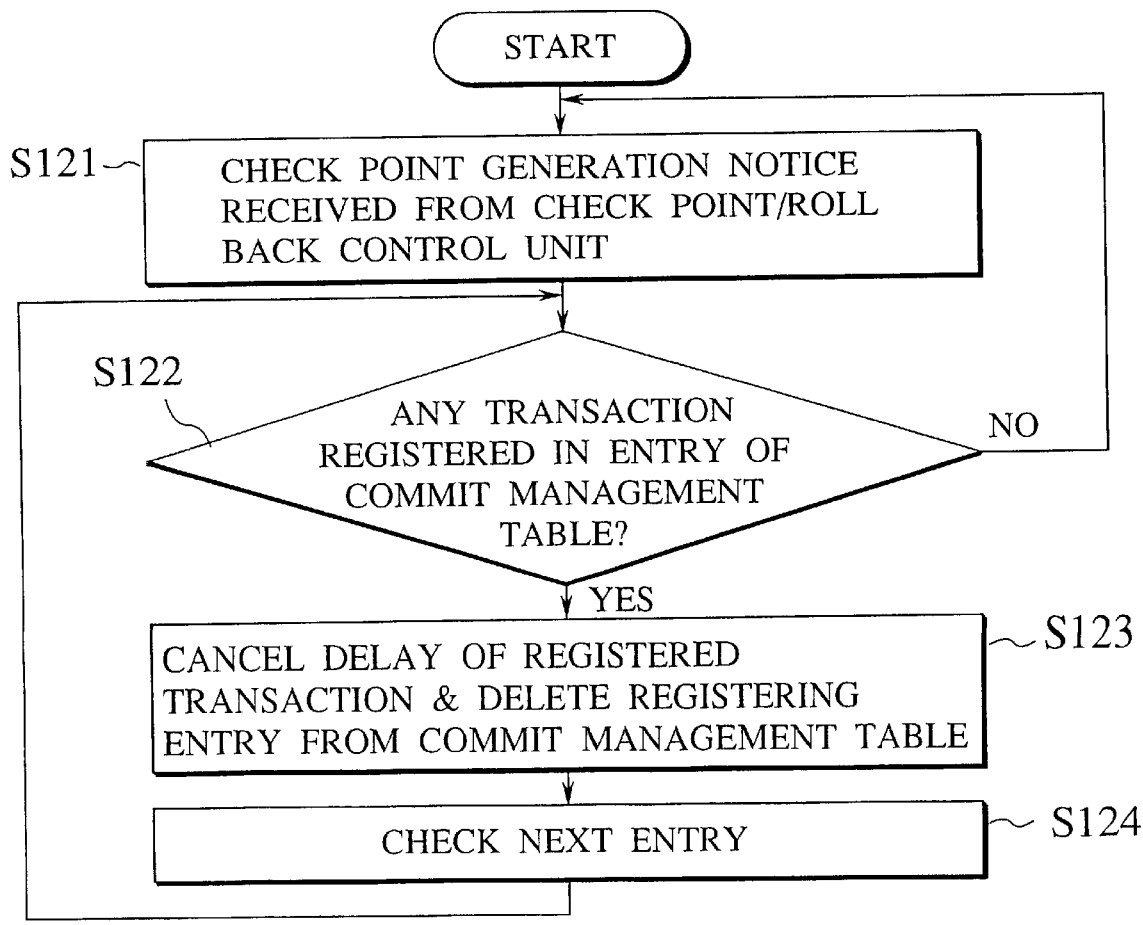
FIG. 6 is a flow chart for the operation of a commit control unit in the computer system of FIG. 2, in the case of receiving a check point generation notice.
Figure 7:
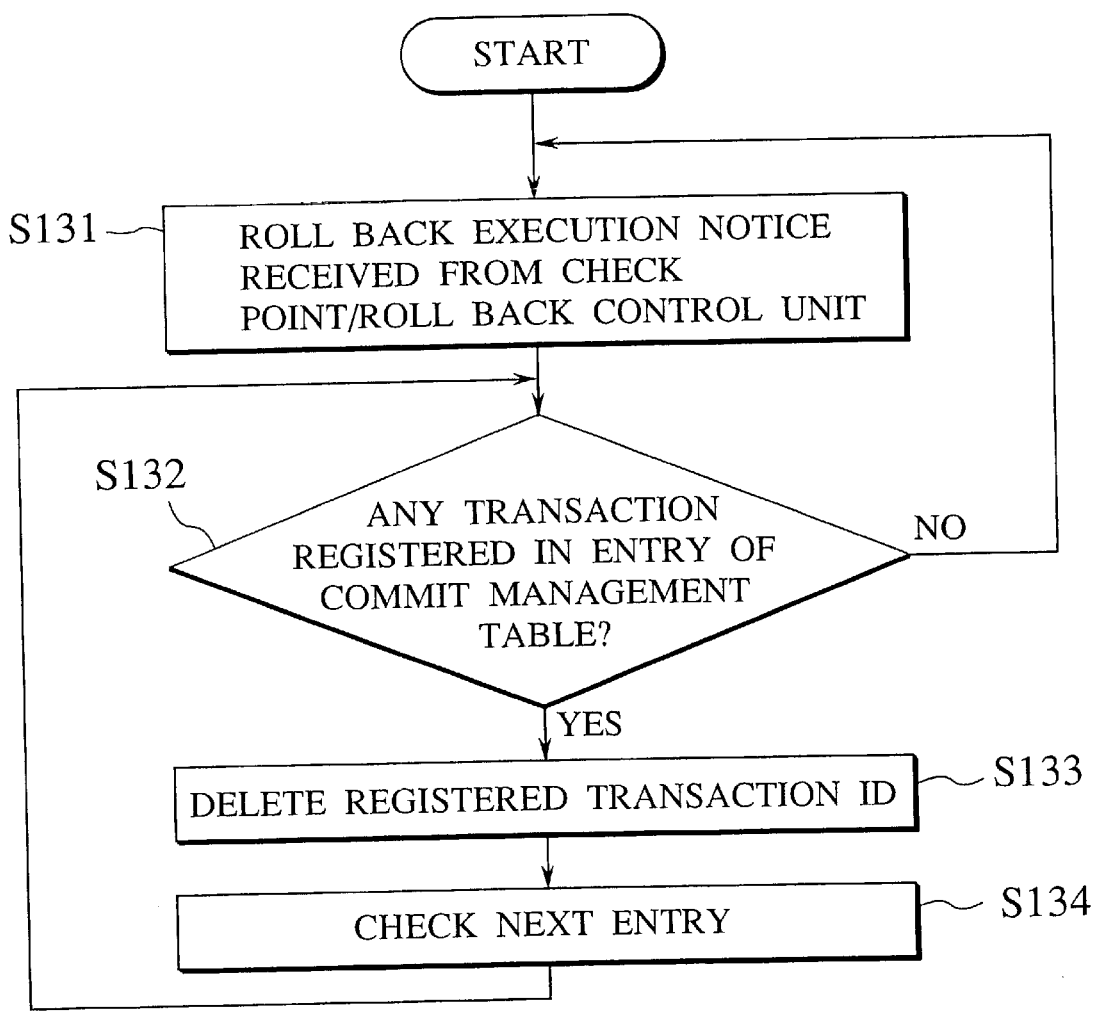
FIG. 7 is a flow chart for the operation of a commit control unit in the computer system of FIG. 2, in the case of receiving a roll back execution notice.

FIG. 5, FIG. 6 and FIG. 7 show a processing procedure of the commit control unit 13, which proceeds as follows.

FIG. 5 shows the processing procedure of the commit control unit 13 in the case where the transaction is committed. In this case, when it is notified that the transaction has been committed from the transaction processing process 12 (step S111), the commit control unit 13 delays the issuance of the transaction commit notice that is to be sent from the transaction processing process 12 to the client process 21 (step S112). Then, the transaction ID indicating this transaction for which the transaction commit notice issuance has been delayed is registered into the commit management table 131 (step S113). This transaction ID is an ID of the committed transaction which is notified from the transaction processing process 12.

FIG. 6 shows the processing procedure of the commit control unit 13 in the case of receiving the check point generation notice from the check point/roll back control unit 11. In this case, when the check point generation notice is received from the check point/roll back control unit 11 (step S121), the commit control unit 13 searches through the commit management table 131 so as to check if any transaction ID is registered therein or not (step S122). When there is a registered transaction ID, the commit control unit 13 takes out the transaction ID from the commit management table 131 one by one, and commands the issuance of the transaction commit notice for the transaction specified by that transaction ID to the transaction processing process 12 so as to cancel the delay, while deleting that transaction ID from the commit management table 131 (step S123). The above processing of the steps S122 and S123 is repeated until the commit management table 131 becomes empty (step S124).

FIG. 7 shows the processing procedure of the commit control unit 13 in the case of receiving the roll back execution notice for the transaction processing process 12 from the check point/roll back control unit 11. In this case, when the roll back execution notice indicating that the transaction processing process 12 has been rolled back is received from the check point/roll back control unit 11 (step S131), the commit control unit 13 checks the commit management table 131 (step S132). If there is a transaction ID registered in the commit management table 131, the commit control unit 13 deletes that registered transaction ID from the commit management table 131 (step S133). The above processing of the steps S132 and S133 is repeated until the commit management table 131 becomes empty (step S134).

Next, with reference to FIG. 8, the overall operation of this first embodiment will be described.

Figure 8:
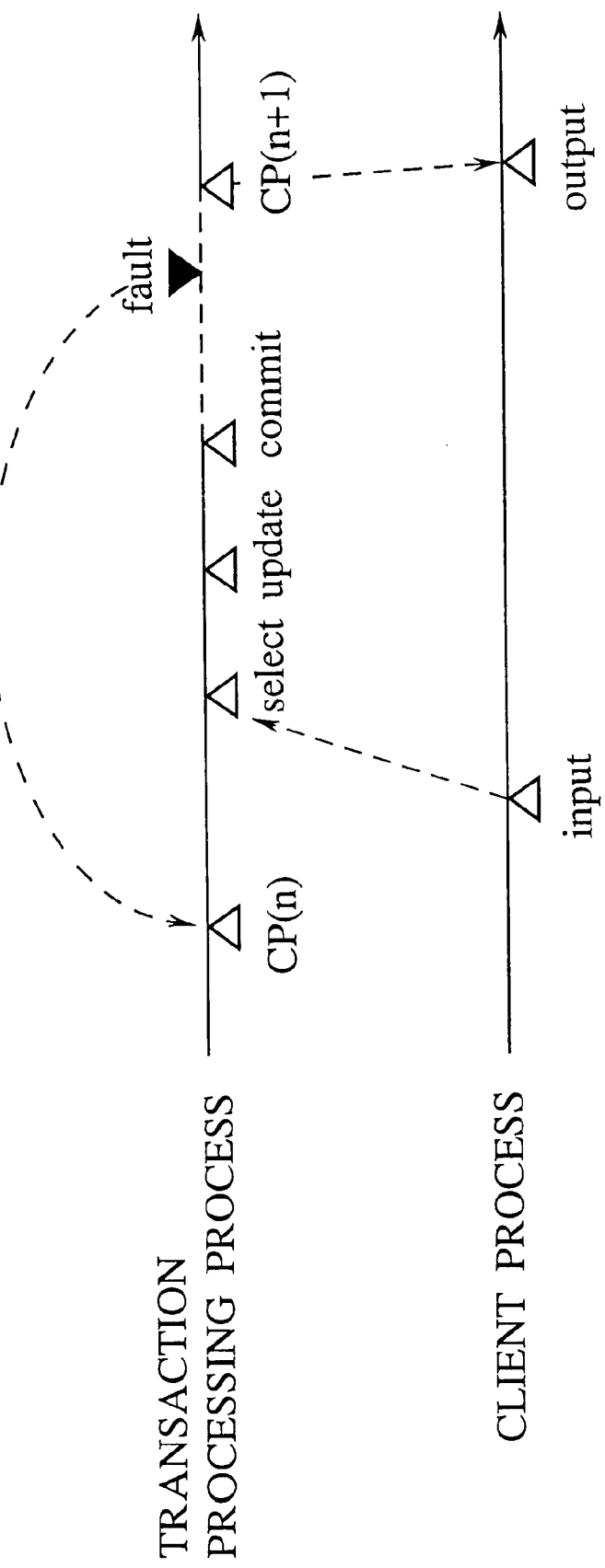
FIG. 8 is a sequence chart for an exemplary transaction processing executed in the computer system of FIG. 2.

FIG. 8 shows an exemplary case where the commit controlling scheme of this first embodiment is applied to the transaction processing of FIG. 1 described above. In this case, the operation proceeds as follows.

(1) A check point CP(n) is generated at the server computer 10.

(2) A user who uses the client computer 20 enters the external input ("input" of FIG. 8) for the transaction processing.

(3) The client process 21 sends a request for "select", "update", and "commit" to the transaction processing process 12.

(4) The transaction processing process 12 carries out "select", "update", and "commit" in response to the request from the client process 21. When the transaction is committed, this fact is notified to the commit control unit 13, and the issuance of the transaction commit notice is delayed by the commit control unit 13 until the issuance of the transaction commit notice to the client process 21 becomes permissible.

(5) If a fault occurs at the server computer 10, the state is rolled back to that of (1). If a fault does not occur at the server computer 10, a new check point CP(n+1) is generated at the server computer 10.

(6) When the new check point CP(n+1) is generated, the issuance of the transaction commit notice is permitted by the commit control unit 13, and the transaction commit notice is sent from the transaction processing process 12 to the client process 21.

(7) The client process 21 notifies to the user that the transaction has been committed, using the external A output ("output" of FIG. 8) such as a screen display.

As described, according to the commit controlling scheme of this first embodiment, even in the case where a fault occurs at the server computer 10 which is executing the transaction processing such that the transaction processing process 12 gets rolled back, the notification to the client process 21 of the fact that the transaction has been committed is delayed until the next check point so that the notification to the user is also not carried out yet, and therefore it is possible to prevent the client (user) side to encounter a contradictory situation where the committed transaction processing gets invalidated.

In addition, by using the commit management table for registering the transaction IDs of those transactions for which the issuance of the transaction commit notice is delayed, it is possible to realize the transaction commit notice delay control with respect to each transaction properly even when the transaction processing process is processing the transaction requests from a plurality of client processes.

Moreover, by deleting all the transaction IDs registered in the commit management table when the transaction processing process is rolled back due to the occurrence of a fault, it is possible to prevent an erroneous issuance of the transaction commit notice to the client process.

Referring now to FIG. 9 to FIG. 12, the second embodiment of the commit controlling scheme for a transaction processing according to the present invention will be described in detail.

Figure 9:
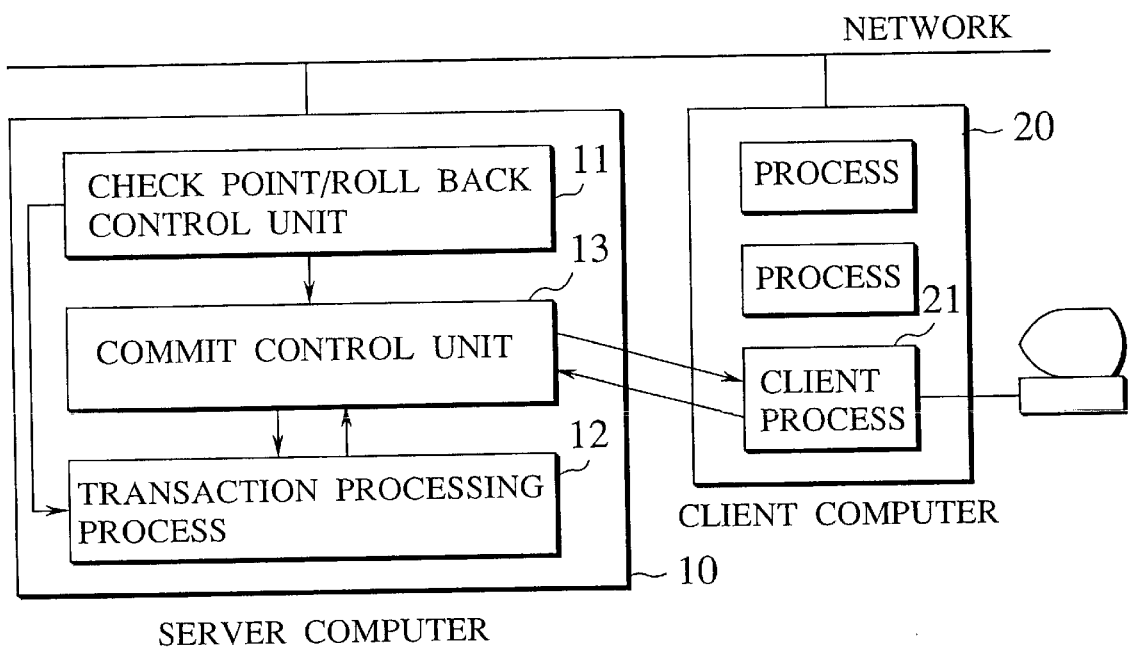
FIG. 9 is a block diagram of a computer system for realizing the commit controlling scheme according to the second embodiment of the present invention.

FIG. 9 shows a configuration of a computer system according to this second embodiment. This second embodiment differs from the first embodiment in that the commit control unit 13 is provided at a location between the transaction processing process 12 and the client process 21 as shown in FIG. 9, and the rest is the same as in the first embodiment.

Namely, in this second embodiment, the commit control unit 13 receives the transaction processing request from the client process 21 and sends the received request to the transaction processing process 12. Also, when the transaction commit notice with respect to the client process 21 is issued from the transaction processing process 12, the commit control unit 13 intercepts this notice and holds it until the check point generation notice from the check point/roll back control unit 11 is newly received thereafter. Then, when the check point generation notice is received, the commit control unit 13 sends the transaction commit notice that has been held therein to the client process 21.

The commit control unit 13 as described above can be realized in a form of a library transparent to users or a function of the OS, besides forms described in the first embodiment. In this case, the client process 21 and the transaction processing process 12 can carry out their processings without becoming conscious of an existence of the commit control unit 13, so that there is an advantage in that there is no need to make any change in the client process 21 and the transaction processing process 12.

The processing procedure of the commit control unit 13 is as follows.

When the transaction processing request is made by the client process 21, the commit control unit 13 receives this request first, and sends the received request to the transaction processing process 12. Here, it is also possible to send the request from the client process 21 to the transaction processing process 12 directly.

Figure 10:
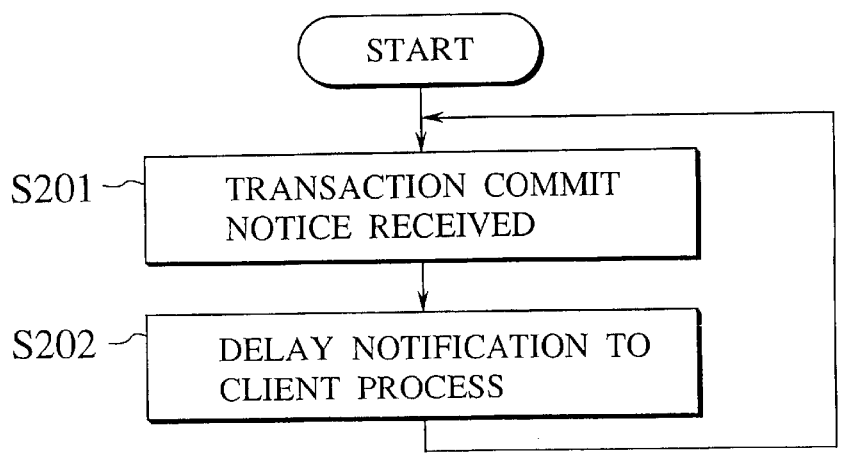
FIG. 10 is a flow chart for the operation of a commit control unit in the computer system of FIG. 9, in the case of receiving a transaction commit notice.

FIG. 10 shows the processing procedure of the commit control unit 13 in the case of receiving the transaction commit notice from the transaction processing process 12. In this case, the commit control unit 13 receives the transaction commit notice on its way from the transaction processing process 12 to the client process 21 (step S201), and holds the received notice as it is (step S202). By intercepting the transaction commit notice from the transaction processing process 12 to the client process 21 at the commit control unit 13 in this way, the timing at which the client process 21 receives the transaction commit notice is delayed until the next check point, similarly as in the first embodiment.

Figure 11:
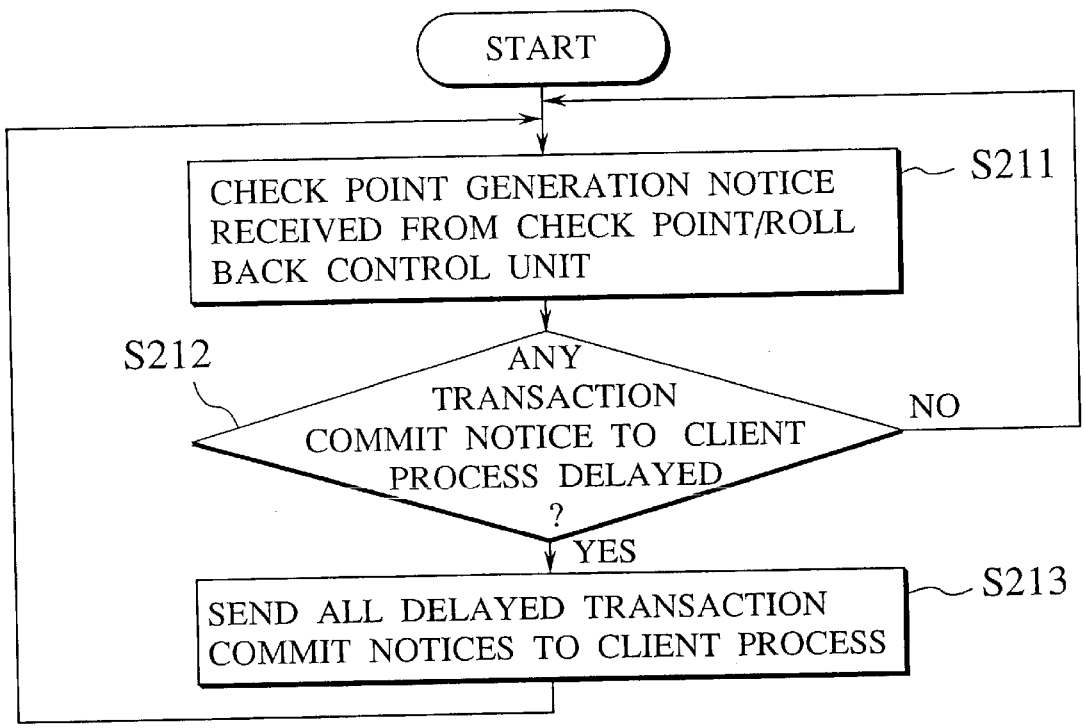
FIG. 11 is a flow chart for the operation of a commit control unit in the computer system of FIG. 9, in the case of receiving a check point generation notice.

FIG. 11 shows the processing procedure of the commit control unit 13 in the case of receiving the check point generation notice from the check point/roll back control unit 11. In this case, when the check point generation notice is received from the check point/roll back control unit 11 (step S211), the commit control unit 13 checks if there is any transaction commit notice that is held therein (step S212). If there is any such transaction commit notice, the commit control unit 13 cancels the delay of each such transaction commit notice and sends each such transaction commit notice to its target client process 21 (step S213).

Figure 12:
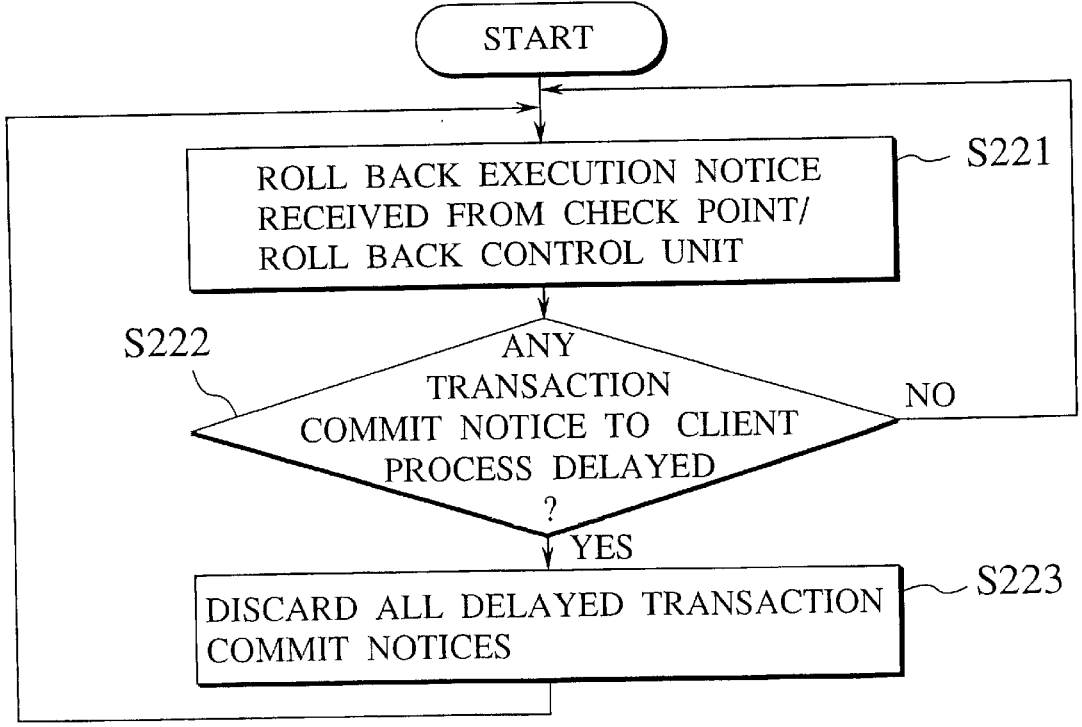
FIG. 12 is a flow chart for the operation of a commit control unit in the computer system of FIG. 9, in the case of receiving a roll back execution notice.

FIG. 12 shows the processing procedure of the commit control unit 13 in the case of receiving the roll back execution notice for the transaction processing process 12 from the check point/roll back control unit 11. In this case, when the roll back execution notice indicating that the transaction processing process 12 has been rolled back is received from the check point/roll back control unit 11 (step S221), the commit control unit 13 checks if there is any transaction commit notice that is held therein (step S222). If there is any such transaction commit notice, the commit control unit 13 discards each such transaction commit notice (step S223).

As described, according to the commit controlling scheme of this second embodiment, even in the case where a fault occurs at the server computer 10 which is executing the transaction processing such that the transaction processing process 12 gets rolled back, the notification to the client process 21 of the fact that the transaction has been committed is delayed until the next check point so that the notification to the user is also not carried out yet, and therefore it is possible to prevent the client (user) side to encounter a contradictory situation where the committed transaction processing gets invalidated.

In addition, this delay processing can be completely realized by the commit control unit 13 alone so that the client process 21 and the transaction processing process 12 need not be conscious of the delay processing.

Referring now to FIG. 13 to FIG. 17, the third embodiment of the commit controlling scheme for a transaction processing according to the present invention will be described in detail.

Figure 13:
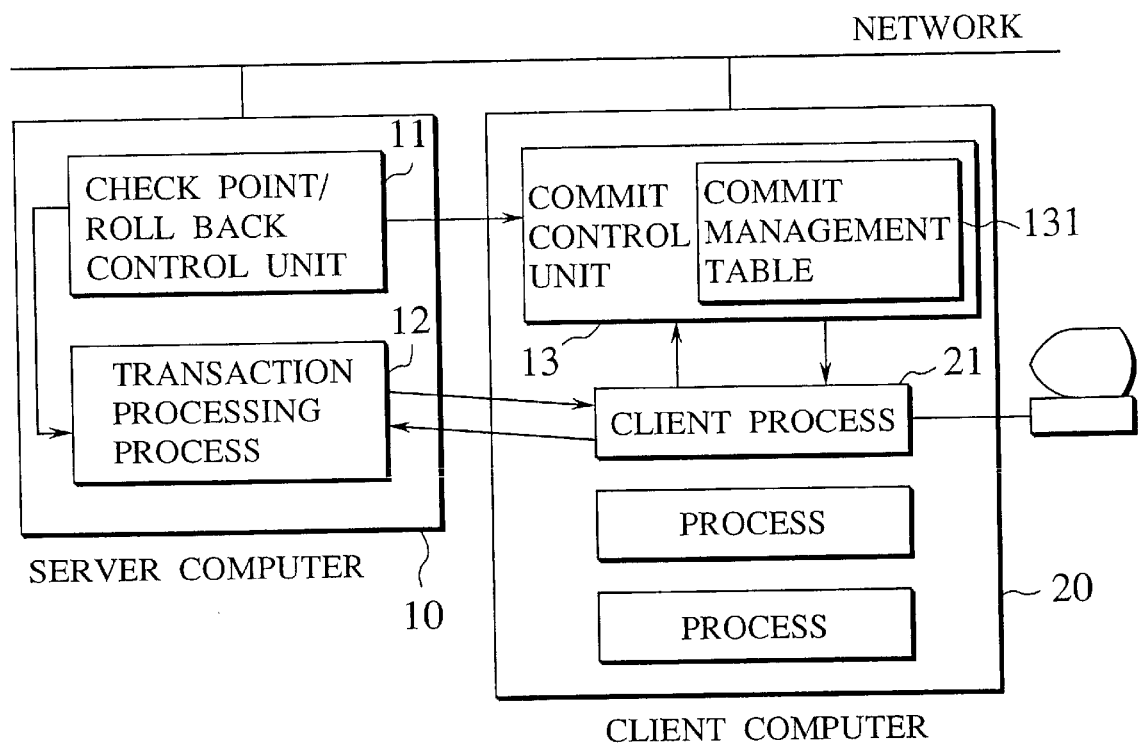
FIG. 13 is a block diagram of a computer system for realizing the commit controlling scheme according to the third embodiment of the present invention.

FIG. 13 shows a configuration of a computer system according to this third embodiment. This third embodiment differs from the first embodiment in that the commit control unit 13 is provided at the client computer 20 side on which the client process 21 is executed, and this commit control unit 13 delays the issuance timing of the external output from the client process 21 to the user.

Namely, in this third embodiment, when the transaction commit notice from the transaction processing process 12 is received by the client process 21, the commit control unit 13 controls the client process 21 to delay the external output for notifying to the user that the transaction has been committed, until the check point is newly generated at the server computer 10 thereafter.

For this processing, the commit control unit 13 uses the commit management table 131 similarly as in the first embodiment. Here, however, in this third embodiment, an ID entry in the commit management table 131 registers a process ID of the client process which received the transaction commit notice, when the transaction commit notice is notified to the client process 21.

Figure 14:
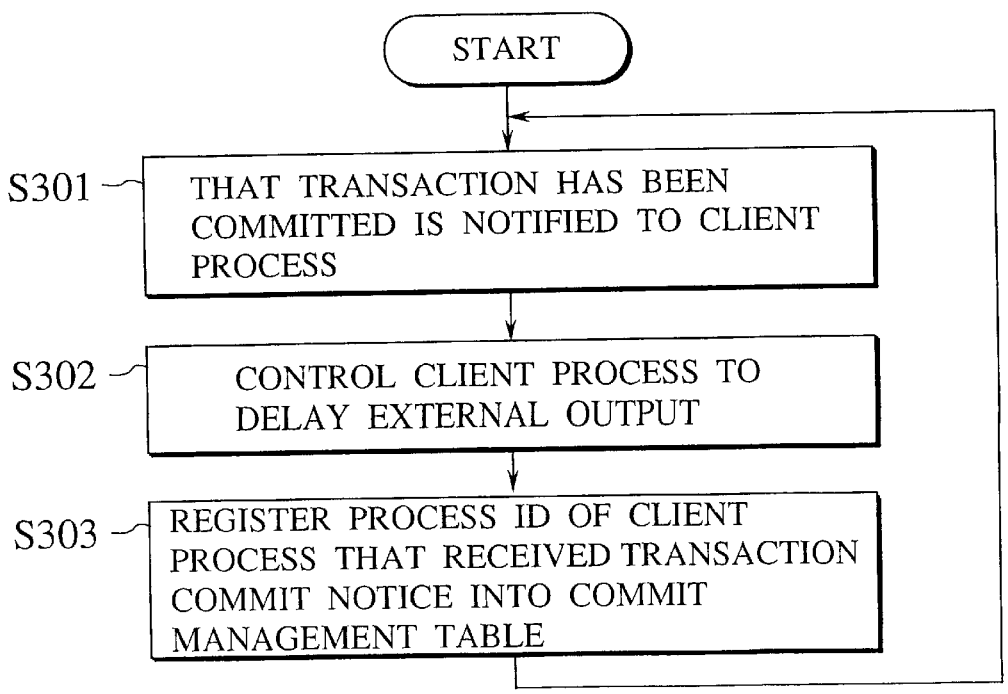
FIG. 14 is a flow chart for the operation of a commit control unit in the computer system of FIG. 13, in the case of receiving a transaction commit notice.
Figure 15:
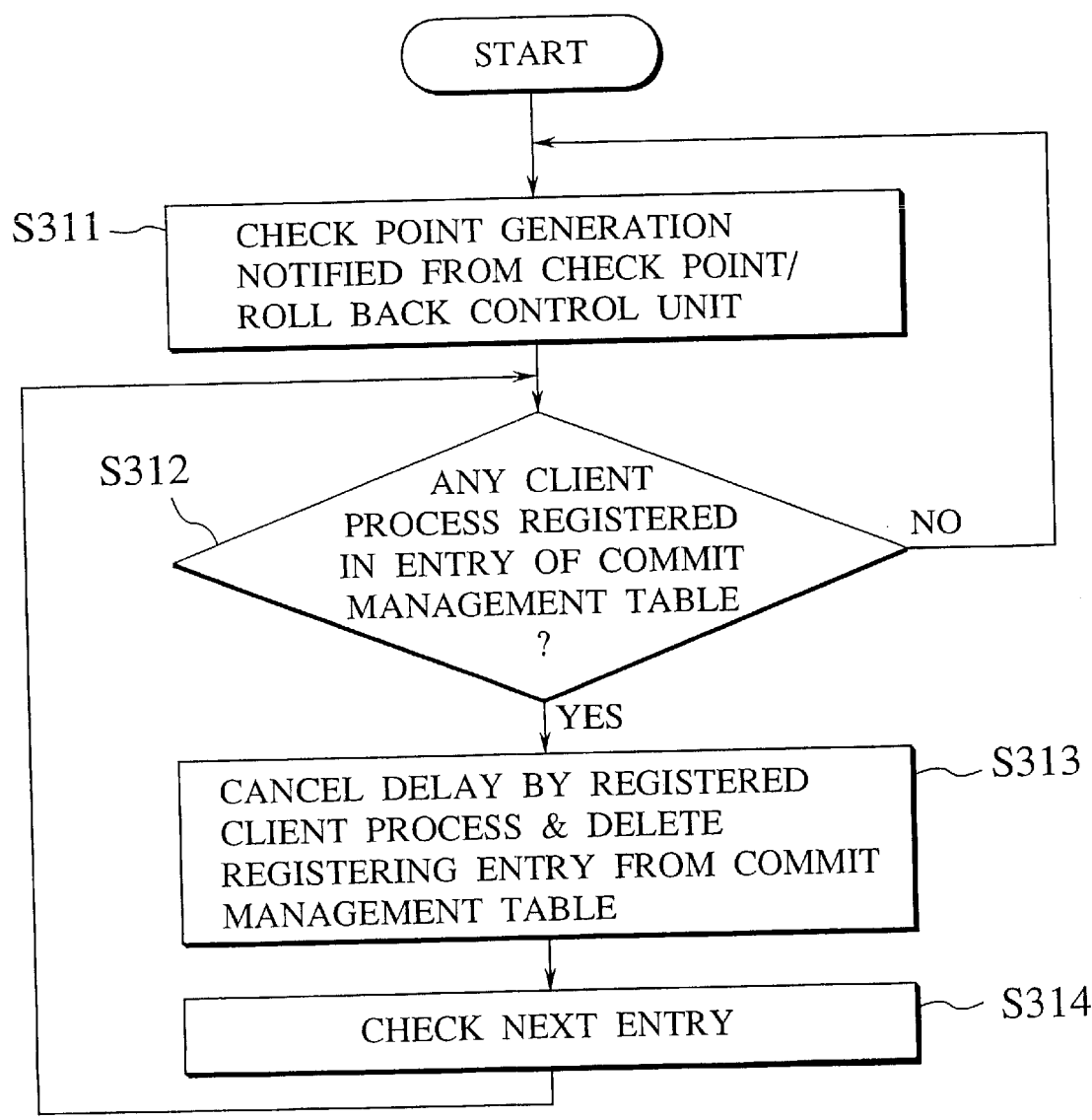
FIG. 15 is a flow chart for the operation of a commit control unit in the computer system of FIG. 13, in the case of receiving a check point generation notice.
Figure 16:
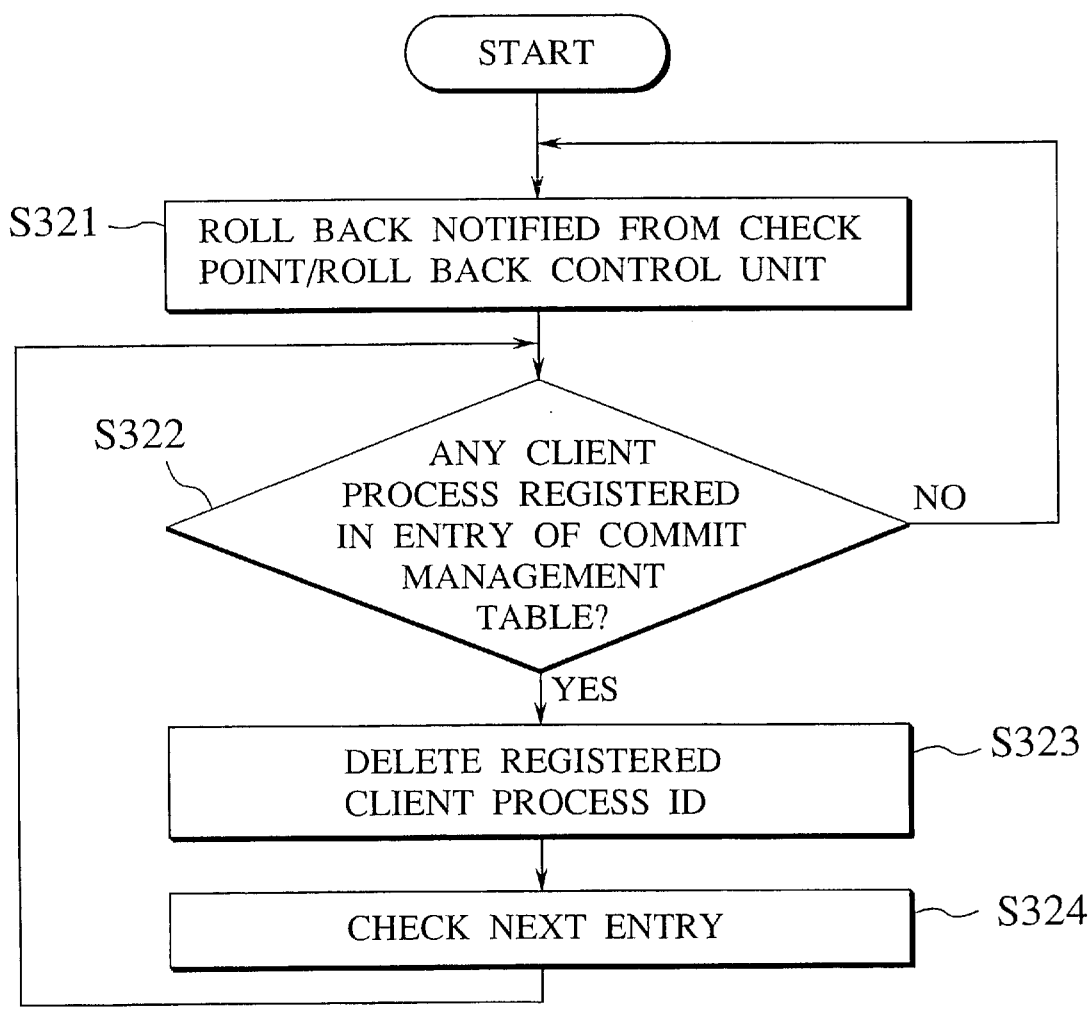
FIG. 16 is a flow chart for the operation of a commit control unit in the computer system of FIG. 13, in the case of receiving la roll back execution notice.

FIG. 14, FIG. 15 and FIG. 16 show a processing procedure of the commit control unit 13, which proceeds as follows.

FIG. 14 shows the processing procedure of the commit control unit 13 in the case where the transaction commit notice from the transaction processing process 12 is received by the client process 21. In this case, when it is notified from the client process 21 that the transaction commit notice from the transaction processing process 12 is received (step S301), the commit control unit 13 controls the client process 21 to delay the issuance of the external output such as screen display for notifying to the user that the transaction has been committed (step S302). Then, the process ID of the client process 21 that received the transaction commit notice is registered into an ID entry of the commit management table 131 (step S303).

FIG. 15 shows the processing procedure of the commit control unit 13 in the case of receiving the check point generation notice from the check point/roll back control unit 11. In this case, when the check point generation notice is received from the check point/roll back control unit 11 (step S311), the commit control unit 13 searches through the commit management table 131 so as to check if any process ID is registered therein or not (step S312). When there is a registered process ID, the commit control unit 13 takes out the process ID from the commit management table 131 one by one, and commands the issuance of the external output to the client process 21 specified by that process ID so as to cancel the delay, while deleting that process ID from the commit management table 131 (step S313). The above processing of the steps S312 and S313 is repeated until the commit management table 131 becomes empty (step S314).

FIG. 16 shows the processing procedure of the commit control unit 13 in the case of receiving the roll back execution notice for the transaction processing process 12 from the check point/roll back control unit 11. In this case, when the roll back execution notice indicating that the transaction processing process 12 has been rolled back is received from the check point/roll back control unit 11 (step S321), the commit control unit 13 checks the commit management table 131 (step S322). If there is a client process whose process ID is registered in the commit management table 131, the commit control unit 13 deletes that registered process ID from the commit management table 131 (step S323). The above processing of the steps S322 and S323 is repeated until the commit management table 131 becomes empty (step S324).

Next, with reference to FIG. 17, the overall operation of this third embodiment will be described.

Figure 17:
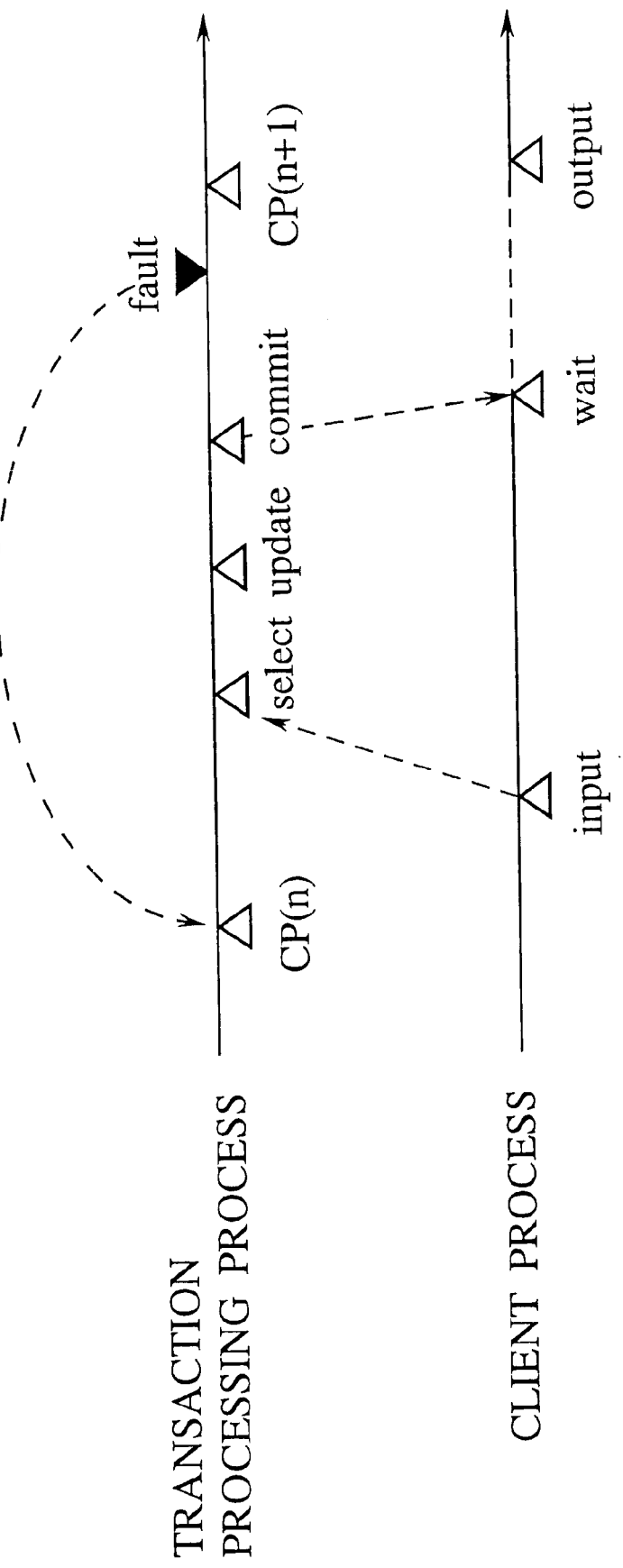
FIG. 17 is a sequence chart for an exemplary transaction processing executed in the computer system of FIG. 13.

FIG. 17 shows an exemplary case where the commit controlling scheme of this third embodiment is applied to the transaction processing of FIG. 1 described above. In this case, the operation proceeds as follows.

(1) A check point CP(n) is generated at the server computer 10.

(2) A user enters the external input ("input" of FIG. 16) for the transaction processing.

(3) The client process 21 sends a request for "select", "update", and "commit" to the transaction processing process 12.

(4) The transaction processing process 12 carries out "select", "update", and "commit" in response to the request from the client process 21. When the transaction is committed, this fact is notified to the client process 21.

(5) When the transaction commit notice is received, the client process 21 notifies this fact to the commit control unit 13, and waits for the issuance of the external output to the user until a permission is given from the commit control unit 13.

(6) If a fault occurs at the server computer 10, the state is rolled back to that of (1). If a fault does not occur at the server computer 10, a new check point CP(n+1) is generated by the server computer 10.

(7) When the new check point CP(n+1) is generated, the issuance of the external output is permitted by the commit control unit 13, and the client process 21 cancels the delay and carries out the external output so as to notify to the user that the transaction has been committed.

Note that, when the transaction processing process 12 is rolled back, the error processing is carried out at the client process 21 side, and the notification to the user of the occurrence of error or the urging of the input for the retry are carried out according to the need.

As described, according to the commit controlling scheme of this third embodiment, even in the case where a fault occurs at the server computer 10 which is executing the transaction processing such that the transaction processing process 12 gets rolled back, the notification to the user of the fact that the transaction has been committed is delayed at the client process 21 until the next check point so that it is possible to prevent the client (user) side to encounter a contradictory situation where the committed transaction processing gets invalidated.

In addition, this delay processing can be completely realized by controlling the client process 21 alone so that the transaction processing process 12 need not be conscious of the delay processing.

Moreover, by using the commit management table for registering the process IDs of those client processes for which the issuance of the external output is delayed, it is possible to realize the external output delay control with respect to each client process properly even when the transaction processing process is processing the transaction requests from a plurality of client processes.

Furthermore, by deleting all the process IDs registered in the commit management table when the transaction processing process is rolled back due to the occurrence of a fault, it is possible to prevent an erroneous issuance of the external output to the user.

Figure 18:
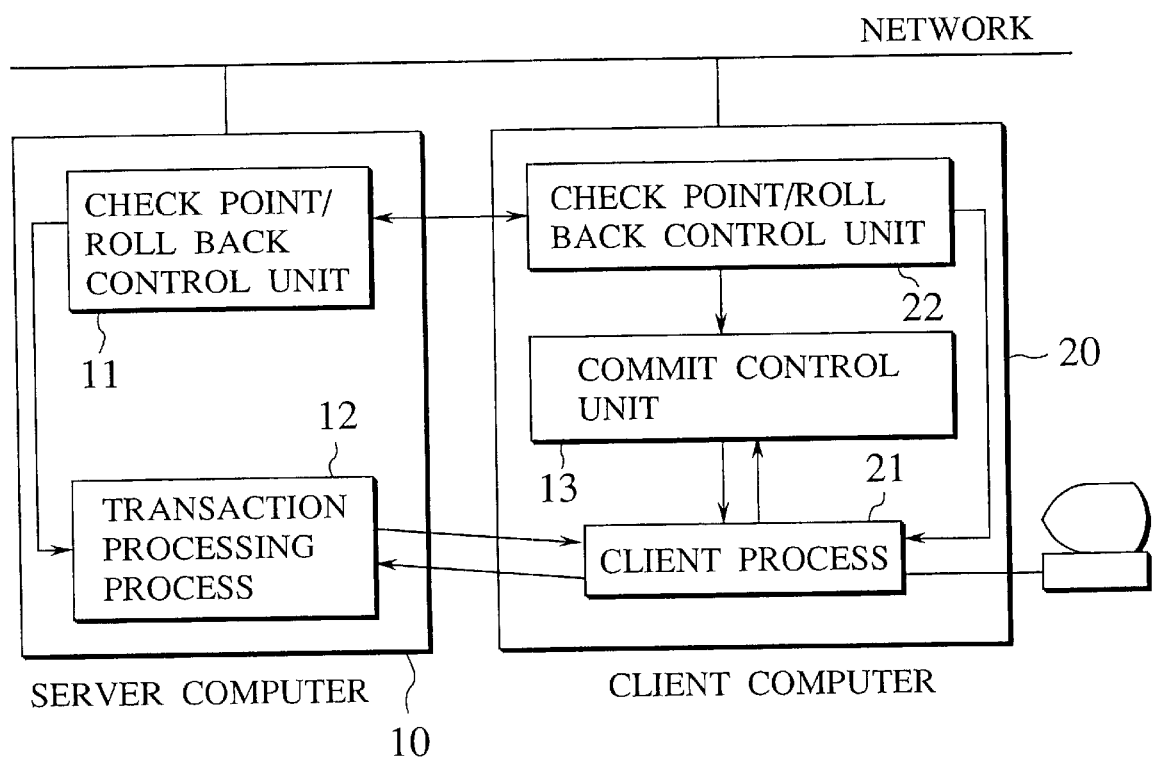
FIG. 18 is a block diagram of a computer system for realizing the commit controlling scheme according to the fourth embodiment of the present invention.
Figure 19:
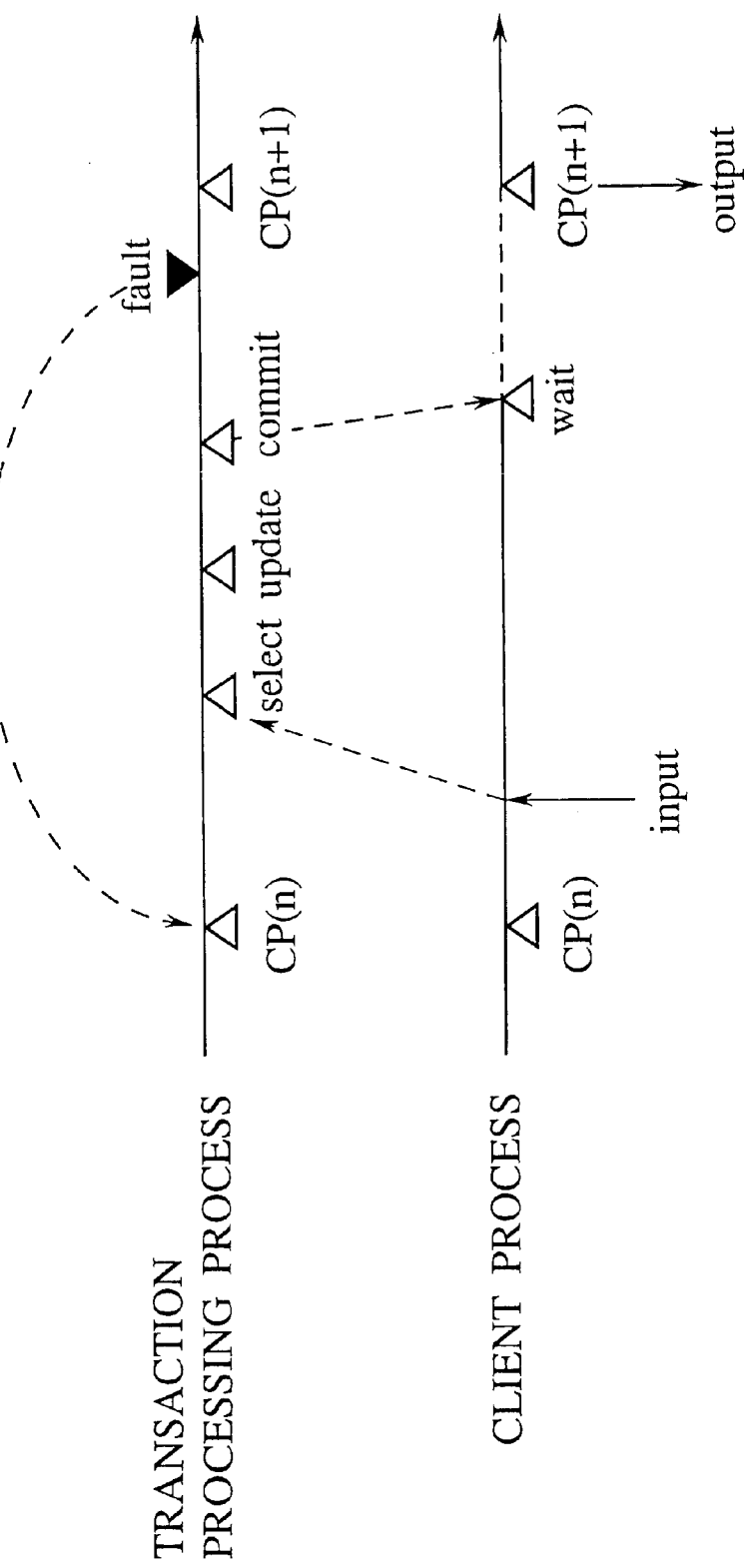
FIG. 19 is a sequence chart for an exemplary transaction processing executed in the computer system of FIG. 18.

Referring now to FIG. 18 and FIG. 19, the fourth embodiment of the commit controlling scheme for a transaction processing according to the present invention will be described in detail.

FIG. 18 shows a configuration of a computer system according to this fourth embodiment. This fourth embodiment adopts the distributed check point/roll back scheme in which the check points are generated in synchronization among the transaction processing process 12 on the server computer 10 and the client process 21 on the client computer 20 which are operating while carrying out the inter-process communications, such that the process states regarding the inter-process communications between these processes can be recovered without contradiction.

Namely, the client computer 20 is provided with a check point/roll back control unit 22 for generating check points for the client process 21 in synchronization with the check point generation by the check point/roll back control unit 11 of the server computer 10. The respective check points for the transaction processing process 12 and the client process 21 are generated in a state where no inter-process communication is carried out, by interrupting the operations of the transaction processing process 12 and the client 21 or by prohibiting the inter-process communications alone. When a fault occurs at the server computer 10 or the client computer 20, both the transaction processing process 12 and the client process 21 are rolled back to the consistent state by the check point/roll back control units 11 and 22. For a realization of such a distributed check point/roll back scheme, it is possible to use the distributed check point/restart method disclosed in Japanese Patent Application No. 8-59188 (1996), for example.

As for the commit control unit 13, the only difference from that of the third embodiment is that the check point generation notice and the roll back execution notice for the client process 21 are also received from the check point/roll back control unit 22, and the rest is the same as that of the third embodiment.

Next, with reference to FIG. 19, the overall operation of this fourth embodiment will be described.

FIG. 19 shows an exemplary case where the commit controlling scheme of this fourth embodiment is applied to the transaction processing of FIG. 1 described above. In this case, the operation proceeds as follows.

(1) A check point CP(n) is generated at the server computer 10 and at the client computer 20 in synchronization.

(2) A user enters the external input ("input" of FIG. 19) for the transaction processing.

(3) The client process 21 sends a request for "select", "update", and "commit" to the transaction processing process 12.

(4) The transaction processing process 12 carries out "select", "update", and "commit" in response to the request from the client process 21. When the transaction is committed, this fact is notified to the client process 21.

(5) When the transaction commit notice is received, the client process 21 notifies this fact to the commit control unit 13, and waits for the issuance of the external output to the user until a permission is given from the commit control unit 13.

(6) If a fault occurs at the server computer 10 or the client computer 20, both the transaction processing process 12 and the client process 21 are rolled back to the state of (1). If a fault does not occur at the server computer 10 and the client computer 20, a new check point CP(n+1) is generated by the server computer 10 and the client computer 20 in synchronization.

(7) When the new check point CP(n+1) for the client process 21 is generated, the issuance of the external output is permitted by the commit control unit 13, and the client process 21 cancels the delay and carries out the external output so as to notify to the user that the transaction has been committed.

As described, according to the commit controlling scheme of this fourth embodiment, even in the case where a fault occurs at the server computer 10 or the client computer 20 such that both the transaction processing process 12 on the server computer 10 and the client process 21 on the client computer 20 get rolled back, the notification to the user of the fact that the transaction has been committed is delayed at the client process 21 until the next check point so that it is possible to prevent the client (user) side to encounter a contradictory situation where the committed transaction processing gets invalidated.

As described above, according to the present invention, it becomes possible to provide a commit controlling scheme for a transaction processing which is capable of guaranteeing the reliability of data of the transaction processing even when the check point/roll back scheme is employed for the purpose of a fault recovery in the transaction processing process. In addition, this commit controlling scheme can be realized without requiring any change in the transaction processing process and the client process such that it can be realized while executing these processes as usual. Moreover, it is also possible to guarantee the reliability of data of the transaction processing even in the case of using the distributed check point/restart scheme.

It is to be noted that the above described embodiment according to the present invention may be conveniently implemented in forms of software programs for realizing the operations of the server computer or the client computer, as will be apparent to those skilled in the computer art. Appropriate software coding can readily be prepared by skilled programmers based on the teachings of the present disclosure, as will be apparent to those skilled in the software art.

In particular, each one of the server computer and the client computer as described above can be conveniently implemented in a form of a software package. Such a software program can be provided in a form of a computer program product which employs a storage medium including stored computer code which is used to program a computer to perform the disclosed function and process of the present invention. The storage medium may include, but is not limited to, any type of conventional floppy disks, optical disks, CD-ROMs, magneto-optical disks, ROMs, RAMs, EPROMs, EEPROMs, magnetic or optical cards, or any other suitable media for storing electronic instructions.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A commit control method for transaction processing executed in a computer system having a fault recovery mechanism for generating check points by recurrently recording process states and for restarting processes by recovering the process states at a check point before a fault occurrence in a case of the fault occurrence, the method comprising the steps of:

detecting a generation of a new check point for a transaction processing process that executes the transaction processing, the generation being performed by the fault recovery mechanism after a transaction is committed by the transaction processing process; and controlling an issuance of an external output for notifying to a user that the transaction has been committed, such that the external output is issued after the generation of the new check point is detected by the detecting step;

wherein the transaction processing is realized by the transaction processing process and a client process which sends a request to the transaction processing process and issues the external output to the user, and the controlling step includes the steps of:

delaying an issuance of a transaction commit notice to be sent from the transaction processing process to the client process when the transaction is committed by the transaction processing process; and issuing the transaction commit notice from the transaction processing process to the client process after the generation of the new check point is detected by the detecting step, such that the client process issues the external output upon receiving the transaction commit notice.

2. A commit control method for transaction processing executed in a computer system having a fault recovery mechanism for generating check points by recurrently recording process states and for restarting processes by recovering the process states at a check point before a fault occurrence in a case of the fault occurrence, the method comprising the steps of:

detecting a generation of a new check point for a transaction processing process that executes the transaction processing, the generation being performed by the fault recovery mechanism after a transaction is committed by the transaction processing process; and controlling an issuance of an external output for notifying to a user that the transaction has been committed, such that the external output is issued after the generation of the new check point is detected by the detecting step;

wherein the transaction processing is realized by the transaction processing process and a client process which sends a request to the transaction processing process and issues the external output to the user, and the controlling step includes the steps of:

intercepting a transaction commit notice sent from the transaction processing process toward the client process when the transaction is committed by the transaction processing process; and sending the transaction commit notice intercepted at the intercepting step to the client process after the generation of the new check point is detected by the detecting step, such that the client process issues the external output upon receiving the transaction commit notice.

3. A commit control method for transaction processing executed in a computer system having a fault recovery mechanism for generating check points by recurrently recording process states and for restarting processes by recovering the process states at a check point before a fault occurrence in a case of the fault occurrence, the method comprising the steps of:

detecting a generation of a new check point for a transaction processing process that executes the transaction processing, the generation being performed by the fault recovery mechanism after a transaction is committed by the transaction processing process; and controlling an issuance of an external output for notifying to a user that the transaction has been committed, such that the external output is issued after the generation of the new check point is detected by the detecting step;

wherein the transaction processing is realized by the transaction processing process and a client process which sends a request to the transaction processing process and issues the external output to the user, and the controlling step delays the issuance of the external output by the client process when a transaction commit notice from the transaction processing process is received by the client process until the generation of the new check point is detected by the detecting step, such that the client process issues the external output after the new check point is generated.

4. A commit control method for transaction processing executed in a computer system having a fault recovery mechanism for generating check points by recurrently recording process states and for restarting processes by recovering the process states at a check point before a fault occurrence in a case of the fault occurrence, the method comprising the steps of:

detecting a generation of a new check point for a transaction processing process that executes the transaction processing, the generation being performed by the fault recovery mechanism after a transaction is committed by the transaction processing process; and controlling an issuance of an external output for notifying to a user that the transaction has been committed, such that the external output is issued after the generation of the new check point is detected by the detecting step;

wherein the transaction processing is realized by the transaction processing process executed on a server computer and a client process executed on a client computer which sends a request to the transaction processing process and issues the external output to the user, the fault recovery mechanism generates a check point for the client process and a check point for the transaction processing process in synchronization such that process states of the transaction processing process and the client process regarding inter-process communications between the transaction processing process and the client process can be recovered without contradiction, and the controlling step delays the issuance of the external output by the client process when a transaction commit notice from the transaction processing process is received by the client process until the generation of the new check point is detected by the detecting step, such that the client process issues the external output at the issuing step after the new check point is generated.

5. A computer system for executing transaction processing, comprising:

a fault recovery mechanism for generating check points by recurrently recording process states and for restarting processes by recovering the process states at a check point before a fault occurrence in a case of the fault occurrence; and a commit control unit for detecting a generation of a new check point for a transaction processing process that executes the transaction processing, the generation being performed by the fault recovery mechanism after a transaction is committed by the transaction processing process, and for controlling an issuance of an external output for notifying to a user that the transaction has been committed, such that the external output is issued after the generation of the new check point is detected;

wherein the transaction processing is realized by the transaction processing process and a client process which sends a request to the transaction processing process and issues the external output to the user, and the commit control unit delays an issuance of a transaction commit notice to be sent from the transaction processing process to the client process when the transaction is committed by the transaction processing process, and permits an issuance of the transaction commit notice from the transaction processing process to the client process after the generation of the new check point is detected, such that the client process issues the external output upon receiving the transaction commit notice.

6. A computer system for executing transaction processing, comprising:

a fault recovery mechanism for generating check points by recurrently recording process states and for restarting processes by recovering the process states at a check point before a fault occurrence in a case of the fault occurrence; and a commit control unit for detecting a generation of a new check point for a transaction processing process that executes the transaction processing, the generation being performed by the fault recovery mechanism after a transaction is committed by the transaction processing process, and for controlling an issuance of an external output for notifying to a user that the transaction has been committed, such that the external output is issued after the generation of the new check point is detected;

wherein the transaction processing is realized by the transaction processing process and a client process which sends a request to the transaction processing process and issues the external output to the user, and the commit control unit intercepts a transaction commit notice sent from the transaction processing process toward the client process when the transaction is committed by the transaction processing process, and sends the intercepted transaction commit notice to the client process after the generation of the new check point is detected, such that the client process issues the external output upon receiving the transaction commit notice.

7. A computer system for executing transaction processing, comprising:

a fault recovery mechanism for generating check points by recurrently recording process states and for restarting processes by recovering the process states at a check point before a fault occurrence in a case of the fault occurrence; and a commit control unit for detecting a generation of a new check point for a transaction processing process that executes the transaction processing, the generation being performed by the fault recovery mechanism after a transaction is committed by the transaction processing process, and for controlling an issuance of an external output for notifying to a user that the transaction has been committed, such that the external output is issued after the generation of the new check point is detected;

wherein the transaction processing is realized by the transaction processing process and a client process which sends a request to the transaction processing process and issues the external output to the user, and the commit control unit delays the issuance of the external output by the client process when a transaction commit notice from the transaction processing process is received by the client process until the generation of the new check point is detected, such that the client process issues the external output after the new check point is generated.

8. A computer system for executing transaction processing, comprising:

a fault recovery mechanism for generating check points by recurrently recording process states and for restarting processes by recovering the process states at a check point before a fault occurrence in a case of the fault occurrence; and a commit control unit for detecting a generation of a new check point for a transaction processing process that executes the transaction processing, the generation being performed by the fault recovery mechanism after a transaction is committed by the transaction processing process, and for controlling an issuance of an external output for notifying to a user that the transaction has been committed, such that the external output is issued after the generation of the new check point is detected;

wherein the transaction processing is realized by the transaction processing process executed on a server computer and a client process executed on a client computer which sends a request to the transaction processing process and issues the external output to the user, the fault recovery mechanism generates a check point for the client process and a check point for the transaction processing process in synchronization such that process states of the transaction processing process and the client process regarding inter-process communications between the transaction processing process and the client process can be recovered without contradiction, and the commit control unit delays the issuance of the external output by the client process when a transaction commit notice from the transaction processing process is received by the client process until the generation of the new check point is detected, such that the client process issues the external output after the new check point is generated.

9. A computer usable medium having computer readable program code means embodied therein for causing a computer to function as a system for executing transaction processing, the computer readable program code means includes:

first computer readable program code means for causing said computer to realize a fault recovery mechanism for generating check points by recurrently recording process states and for restarting processes by recovering the process states at a check point before a fault occurrence in a case of the fault occurrence; and second computer readable program code means for causing said computer to realize a commit control unit for detecting a generation of a new check point for a transaction processing process that executes the transaction processing, the generation being performed by the first computer readable program code means after a transaction is committed by the transaction processing process, and for controlling an issuance of an external output for notifying to a user that the transaction has been committed, such that the external output is issued after the generation of the new check point is detected;

wherein the transaction processing is realized by the transaction processing process and a client process which sends a request to the transaction processing process and issues the external output to the user, and the second computer readable program code means delays an issuance of a transaction commit notice to be sent from the transaction processing process to the client process when the transaction is committed by the transaction processing process, and permits an issuance of the transaction commit notice from the transaction processing process to the client process after the generation of the new check point is detected, such that the client process issues the external output upon receiving the transaction commit notice.

10. A computer usable medium having computer readable program code means embodied therein for causing a computer to function as a system for executing transaction processing, the computer readable program code means includes:

first computer readable program code means for causing said computer to realize a fault recovery mechanism for generating check points by recurrently recording process states and for restarting processes by recovering the process states at a checkpoint before a fault occurrence in a case of the fault occurrence; and second computer readable program code means for causing said computer to realize a commit control unit for detecting a generation of a new check point for a transaction processing process that executes the transaction processing, the generation being performed by the first computer readable program code means after a transaction is committed by the transaction processing process, and for controlling an issuance of an external output for notifying to a user that the transaction has been committed, such that the external output is issued after the generation of the new check point is detected;

wherein the transaction processing is realized by the transaction processing process and a client process which sends a request to the transaction processing process and issues the external output to the user, and the second computer readable program code means intercepts a transaction commit notice sent from the transaction processing process toward the client process when the transaction is committed by the transaction processing process, and sends the transaction commit notice intercepted to the client process after the generation of the new check point is detected, such that the client process issues the external output upon receiving the transaction commit notice.

11. A computer usable medium having computer readable program code means embodied therein for causing a computer to function as a system for executing transaction processing, the computer readable program code means includes:

first computer readable program code means for causing said computer to realize a fault recovery mechanism for generating check points by recurrently recording process states and for restarting processes by recovering the process states at a check point before a fault occurrence in a case of the fault occurrence; and second computer readable program code means for causing said computer to realize a commit control unit for detecting a generation of a new check point for a transaction processing process that executes the transaction processing, the generation being performed by the first computer readable program code means after a transaction is committed by the transaction processing process, and for controlling an issuance of an external output for notifying to a user that the transaction has been committed, such that the external output is issued after the generation of the new check point is detected;

wherein the transaction processing is realized by the transaction processing process and a client process which sends a request to the transaction processing process and issues the external output to the user, and the second computer readable program code means delays the issuance of the external output by the client process when a transaction commit notice from the transaction processing process is received by the client process until the generation of the new check point is detected, such that the client process issues the external output after the new check point is generated.

12. A computer usable medium having computer readable program code means embodied therein for causing a computer to function as a system for executing transaction processing, the computer readable program code means includes:

first computer readable program code means for causing said computer to realize a fault recovery mechanism for generating check points by recurrently recording process states and for restarting processes by recovering the process states at a check point before a fault occurrence in a case of the fault occurrence; and second computer readable program code means for causing said computer to realize a commit control unit for detecting a generation of a new check point for a transaction processing process that executes the transaction processing, the generation being performed by the first computer readable program code means after a transaction is committed by the transaction processing process, and for controlling an issuance of an external output for notifying to a user that the transaction has been committed, such that the external output is issued after the generation of the new check point is detected;

wherein the transaction processing is realized by the transaction processing process executed on a server computer and a client process executed on a client computer which sends a request to the transaction processing process and issues the external output to the user, the first computer readable program code means generates a check point for the client process and a check point for the transaction processing process in synchronization such that process states of the transaction processing process and the client process regarding interprocess communications between the transaction processing process and the client process can be recovered without contradiction, and the second computer readable program code means delays the issuance of the external output by the client process when a transaction commit notice from the transaction processing process is received by the client process until the generation of the new check point is detected, such that the client process issues the external output after the new check point is generated.

* * * * *